United States Patent
Lu et al.

(10) Patent No.: US 11,894,581 B2
(45) Date of Patent: Feb. 6, 2024

(54) CENTRIFUGAL BATTERY LIQUID INJECTION MECHANISM AND LIQUID INJECTION METHOD THEREOF

(71) Applicant: Shenzhen Greensun Technology Co., Ltd., Shenzhen (CN)

(72) Inventors: Shuli Lu, Shenzhen (CN); Chenghua Luo, Shenzhen (CN); Jin Zhang, Shenzhen (CN); Qingyi Wang, Shenzhen (CN); Junhui Zheng, Shenzhen (CN); Jing Zhang, Shenzhen (CN); Yangqing Luo, Shenzhen (CN)

(73) Assignee: Shenzhen Greensun Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/956,447

(22) Filed: Sep. 29, 2022

(65) Prior Publication Data
US 2023/0299445 A1    Sep. 21, 2023

(30) Foreign Application Priority Data
Mar. 21, 2022    (CN) .......................... 202210275891.6

(51) Int. Cl.
*H01M 50/609*    (2021.01)
*H01M 50/618*    (2021.01)
(Continued)

(52) U.S. Cl.
CPC ......... *H01M 50/609* (2021.01); *B05B 9/0409* (2013.01); *B05B 13/0278* (2013.01);
(Continued)

(58) Field of Classification Search
CPC .. H01M 50/60; H01M 50/609; H01M 50/618; H01M 50/627; H01M 50/668; H01M 50/673; H01M 50/682; B05B 13/0278; B05B 13/0627; B05B 15/68; B05B 9/0409; Y02P 70/50
See application file for complete search history.

(56) References Cited

FOREIGN PATENT DOCUMENTS

| CN | 102280609 A | * | 12/2011 |
| CN | 102280609 A |   | 12/2011 |

(Continued)

OTHER PUBLICATIONS

CN110416445A translation (Year: 2019).*
CN102280609A translation (Year: 2011).*

*Primary Examiner* — Lingwen R Zeng

(57) ABSTRACT

Provided are a centrifugal battery liquid injection mechanism and a liquid injection method thereof. The centrifugal battery liquid injection mechanism comprises a liquid injection device and a driving device, the liquid injection device is provided with a piston mechanism and a liquid outlet head capable of being opened and closed, and one end of the liquid injection device close to the liquid outlet head is further provided with a liquid injection port capable of being opened and closed; and the liquid injection port is used for injecting a wetting liquid into the liquid injection device. The liquid injection device is connected with a to-be-wetted device through the liquid outlet head, so as to inject the wetting liquid into the to-be-wetted device. The driving device is connected with the to-be-wetted device for driving the to-be-wetted device to move.

4 Claims, 6 Drawing Sheets

(51) Int. Cl.
    *B05B 13/02*         (2006.01)
    *B05B 15/68*         (2018.01)
    *H01M 50/60*        (2021.01)
    *H01M 50/627*       (2021.01)
    *H01M 50/682*       (2021.01)
    *B05B 9/04*          (2006.01)
    *B05B 13/06*         (2006.01)
    *H01M 50/673*       (2021.01)

(52) U.S. Cl.
    CPC ........... *B05B 13/0627* (2013.01); *B05B 15/68* (2018.02); *H01M 50/60* (2021.01); *H01M 50/618* (2021.01); *H01M 50/627* (2021.01); *H01M 50/668* (2021.01); *H01M 50/673* (2021.01); *H01M 50/682* (2021.01); *Y02P 70/50* (2015.11)

(56) References Cited

FOREIGN PATENT DOCUMENTS

| | | | |
|---|---|---|---|
| CN | 106450145 A | | 2/2017 |
| CN | 110416445 A | * | 11/2019 |
| CN | 110416445 A | | 11/2019 |
| CN | 210668587 U | | 6/2020 |
| CN | 111785906 A | | 10/2020 |
| CN | 113270697 A | | 8/2021 |
| CN | 113451716 A | | 9/2021 |
| CN | 113948831 A | | 1/2022 |
| JP | 2019145235 A | | 8/2019 |

\* cited by examiner

CENTRIFUGAL BATTERY LIQUID INJECTION MECHANISM AND LIQUID INJECTION METHOD THEREOF

CROSS REFERENCE TO RELATED APPLICATIONS

This application claims foreign priority of Chinese Patent Application No. 202210275891.6, filed on Mar. 21, 2022 in the China National Intellectual Property Administration, the disclosures of all of which are hereby incorporated by reference.

TECHNICAL FIELD

The present invention belongs to battery electrolyte injection equipment, and particularly relates to a centrifugal battery liquid injection mechanism and a liquid injection method thereof.

BACKGROUND

With the advent of the era of electronic intelligence, people's demand for electronic products is increasing, and batteries providing working power for the electronic products have become the focus, especially the development of lithium ion battery has become a hot topic. Electrolyte is an important component of the lithium ion battery, and liquid injection is an important process of injecting a certain amount of electrolyte into the lithium ion battery, and is a very important link in a production process of the lithium ion battery.

However, at present, according to a method of battery liquid injection in the market, the electrolyte is injected into the battery first, then the whole battery is put into a high-pressure cavity, and the battery is wetted by applying a high pressure through the high-pressure cavity. This method has the following defects: firstly, the high-pressure cavity belongs to a third class high pressure vessel, with a high manufacturing cost and a high risk; secondly, a positive and negative pressure circulation process of the high-pressure cavity has a long time period and an unapparent wetting effect; thirdly, there are a complex structure and a cost high; and fourthly, it is difficult to control a liquid injection amount, wherein excessive liquid injection amount easily causes a bulge of the battery, resulting in a poor thickness of the battery; insufficient liquid injection can reduce a capacity of the battery; and uneven liquid injection amount leads to an unstable performance of the battery.

SUMMARY

In order to overcome the defects in the prior art above, the present invention puts forward a centrifugal battery liquid injection mechanism and a liquid injection method thereof, with the advantages of apparent wetting effect, high safety performance, low cost and simple operation.

The object of the present invention is achieved by the following technical solutions.

A centrifugal battery liquid injection mechanism is provided, which comprises a liquid injection device and a driving device, wherein,
the liquid injection device is provided with a piston mechanism and a liquid outlet head capable of being opened and closed; one end of the liquid injection device close to the liquid outlet head is further provided with a liquid injection port capable of being opened and closed; the liquid injection port is used for injecting a wetting liquid into the liquid injection device; and the liquid injection device is connected with a to-be-wetted device through the liquid outlet head, so as to inject the wetting liquid into the to-be-wetted device; and
the driving device is connected with the to-be-wetted device for driving the to-be-wetted device to move.

In a specific embodiment, one end of the liquid injection device far away from the liquid outlet head is provided with a mechanical valve; and the mechanical valve is connected with an external air pump, so as to drive the piston mechanism to slide in the liquid injection device based air blowing and suction of the air pump.

In a specific embodiment, the piston mechanism comprises a piston and a driving rod; an edge of the piston clings to an inner wall of the liquid injection device, and the driving rod is connected with the piston, so as to drive the piston to slide along the inner wall of the liquid injection device.

In a specific embodiment, the centrifugal battery liquid injection mechanism further comprises a supporting device, wherein the liquid injection device and the to-be-wetted device are both connected with the supporting device; and
the driving device is connected with the to-be-wetted device by being connected with the supporting device.

In a specific embodiment, the supporting device is provided with a bayonet; and the to-be-wetted device is detachably connected with the supporting device by being embedded into the bayonet.

In a specific embodiment, the supporting device is further provided with a stereoscopic position regulating assembly, and the liquid injection device is connected with the stereoscopic position regulating assembly.

In a specific embodiment, the liquid outlet head comprises a hose tube.

A liquid injection method is provided, wherein the liquid injection method uses the centrifugal battery liquid injection mechanism, and comprises the following steps of:
injecting the wetting liquid into the liquid injection device through the liquid injection port;
opening the liquid outlet head, controlling the piston mechanism to move towards one end of the liquid outlet head, and injecting the wetting liquid in the liquid injection device into the to-be-wetted device; and
controlling the driving device to drive the to-be-wetted device to move, so that the wetting liquid is fully wetted in the to-be-wetted device.

In a specific embodiment, the step of injecting the wetting liquid into the liquid injection device through the liquid injection port comprises:
closing the liquid outlet head and the liquid injection port, and controlling the piston mechanism to move towards one end far away from the liquid outlet head, so as to form a negative pressure space between the liquid outlet head and the piston mechanism;
opening the liquid injection port, and injecting the wetting liquid into the liquid injection device through the liquid injection port; and
after finishing liquid injection, closing the liquid injection port.

In a specific embodiment, the liquid injection method further comprises:
keeping the liquid injection port in a closed state, opening the liquid outlet head, and controlling the piston mechanism to move towards one end far away from the liquid outlet head, so as to pump out gas in the to-be-wetted device.

The present invention at least has the following beneficial effects.

The present invention provides the centrifugal battery liquid injection mechanism and the liquid injection method thereof. The centrifugal battery liquid injection mechanism comprises the liquid injection device and the driving device, the liquid injection device is provided with the piston mechanism and the liquid outlet head capable of being opened and closed, and one end of the liquid injection device close to the liquid outlet head is further provided with the liquid injection port capable of being opened and closed; and the liquid injection port is used for injecting the wetting liquid into the liquid injection device. The liquid injection device is connected with the to-be-wetted device through the liquid outlet head, so as to inject the wetting liquid into the to-be-wetted device. The driving device is connected with the to-be-wetted device for driving the to-be-wetted device to move. Compared with the prior art, the centrifugal battery liquid injection mechanism and the liquid injection method thereof put forward by the invention have the advantages of apparent wetting effect, high safety performance, low cost and simple operation.

Further, the to-be-wetted device is detachably connected with the supporting device by arranging the bayonet on the supporting device, so that the to-be-wetted device is disassembled conveniently, and meanwhile, a fixing function of the bayonet improves the safety and the reliability during movement of the to-be-wetted device.

Further, the liquid outlet head of the liquid injection device is the hose tube or the supporting device is provided with the stereoscopic position adjusting assembly, which is convenient for adjusting an overall position of the liquid outlet head of the liquid injection device or the liquid injection device, so that the to-be-wetted device is conveniently connected with the liquid injection device, and outside air will not enter the to-be-wetted device or the liquid injection device, thus improving a liquid injection efficiency.

To make the above objects, features and advantages of the present invention more obvious and easier to understand, the following preferred embodiments are given in detail with reference to the drawings attached.

BRIEF DESCRIPTION OF THE DRAWINGS

In order to illustrate the technical solutions in the embodiments of the present application more clearly, the accompanying drawings which need to be used in describing the embodiments will be briefly introduced hereinafter. Apparently, the accompanying drawings described hereinafter are only some embodiments of the present application, those of ordinary skills in the art may obtain other accompanying drawings according to these accompanying drawings without going through any creative work.

Figure 1:
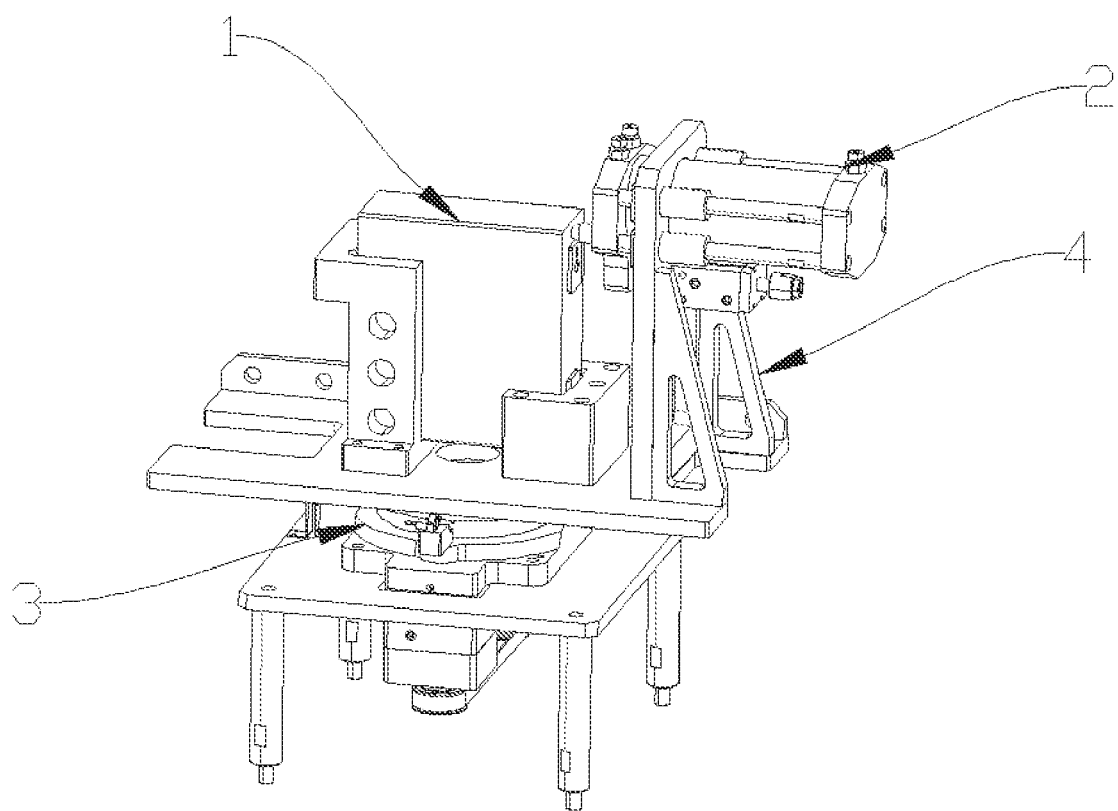
FIG. 1 is an overall schematic diagram of a centrifugal battery liquid injection mechanism provided by Embodiment 1.

REFERENCE NUMERALS 1 refers to to-be-wetted device; 2 refers to liquid injection device; 3 refers to driving device; 4 refers to supporting device;

11 refers to liquid injection port; 12 refers to mechanical valve; 13 refers to piston;

22 refers to supporting column; 23 refers to limiting member; 27 refers to liquid outlet head;

41 refers to base plate; 42 refers to bracket; 43 refers to bayonet; and 421 refers to fixed plate; 422 refers to first supporting plate; and 423 refers to second supporting plate.

DETAILED DESCRIPTION

The technical solutions in the embodiments of the present invention are clearly and completely described with reference to the drawings in the embodiments of the present invention. Obviously, the described embodiments are merely some but not all of the embodiments of the present invention. Based on the embodiments in the present invention, all other embodiments obtained by those of ordinary skills in the art without going through any creative work should fall within the scope of protection of the present invention.

The present invention provides a centrifugal battery liquid injection mechanism and a liquid injection method thereof. The centrifugal battery liquid injection mechanism comprises a liquid injection device 2 and a driving device 3, the liquid injection device 2 is provided with a piston mechanism and a liquid outlet head 27 capable of being opened and closed, and one end of the liquid injection device 2 close to the liquid outlet head 27 is further provided with a liquid injection port 11 capable of being opened and closed; and the liquid injection port 11 is used for injecting a wetting liquid into the liquid injection device 2. The liquid injection device 2 is connected with a to-be-wetted device 1 through the liquid outlet head 27, so as to inject the wetting liquid into the to-be-wetted device 1. The driving device 3 is connected with the to-be-wetted device 1 for driving the to-be-wetted device 1 to move. A liquid injection method thereof comprises the following steps of: injecting the wetting liquid into the liquid injection device 2 through the liquid injection port 11; opening the liquid outlet head 27, controlling the piston mechanism to move towards one end of the liquid outlet head 27, and injecting the wetting liquid in the liquid injection device 2 into the to-be-wetted device 1; and controlling the driving device 3 to drive the to-be-wetted device 1 to move, so that the wetting liquid is fully wetted in the to-be-wetted device 1. Compared with the prior art, the centrifugal battery liquid injection mechanism and the liquid injection method thereof put forward by the invention have the advantages of apparent wetting effect, high safety performance, low cost and simple operation.

Embodiment 1

As shown in FIG. 1 to FIG. 4, a centrifugal battery liquid injection mechanism comprises a liquid injection device 2 and a driving device 3. The liquid injection device 2 is provided with a piston mechanism 13 and a liquid outlet head 27 capable of being opened and closed. One end of the liquid injection device 2 close to the liquid outlet head 27 is further provided with a liquid injection port 11 capable of being opened and closed, and the liquid injection port 11 is used for injecting a wetting liquid into the liquid injection device 2. The liquid injection device 2 is connected with a to-be-wetted device 1 through the liquid outlet head 27, so as to inject the wetting liquid into the to-be-wetted device 1. The driving device 3 is connected with the to-be-wetted device 1 for driving the to-be-wetted device 1 to move.

Specifically, the driving the to-be-wetted device 1 to move may be repetitive movement along multiple points or rotation around a center point. In the embodiment, the driving device 3 is connected with the to-be-wetted device 1 for driving the to-be-wetted device 1 to rotate around the center point, so that the wetting liquid is fully wetted in the to-be-wetted device 1, thus improving a wetting efficiency.

Figure 2:
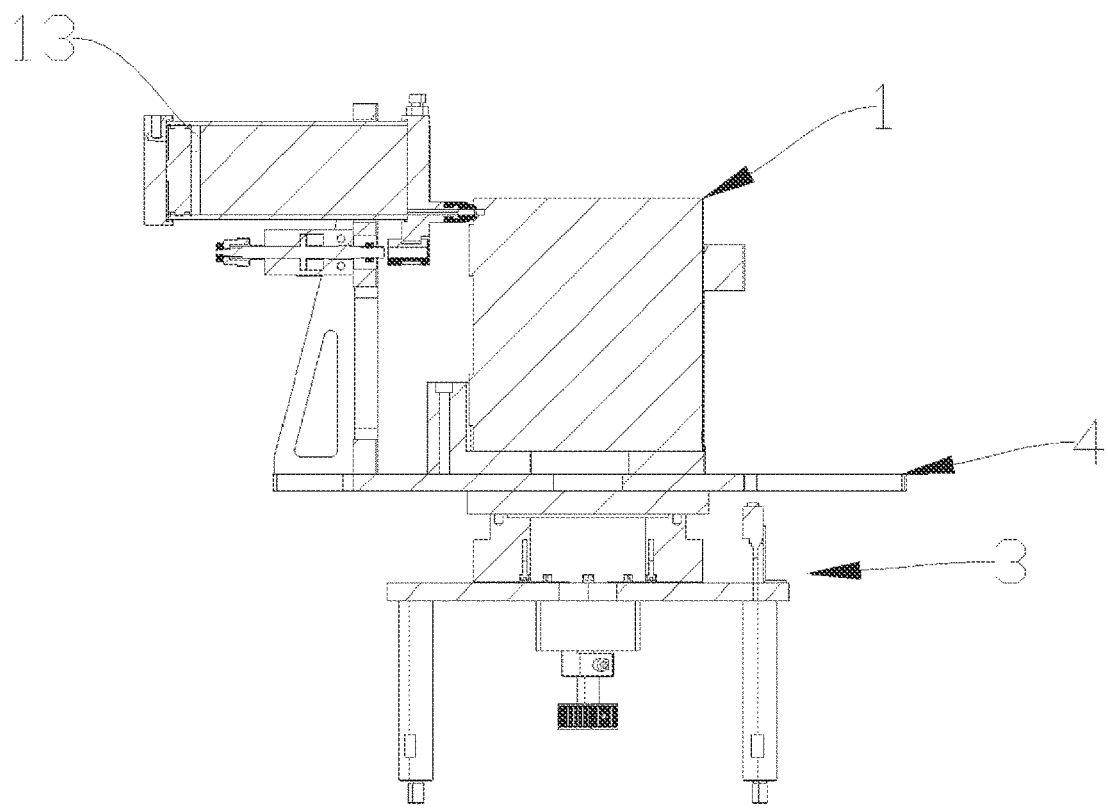
FIG. 2 is a sectional view of the centrifugal battery liquid injection mechanism provided by Embodiment 1.
Figure 3:
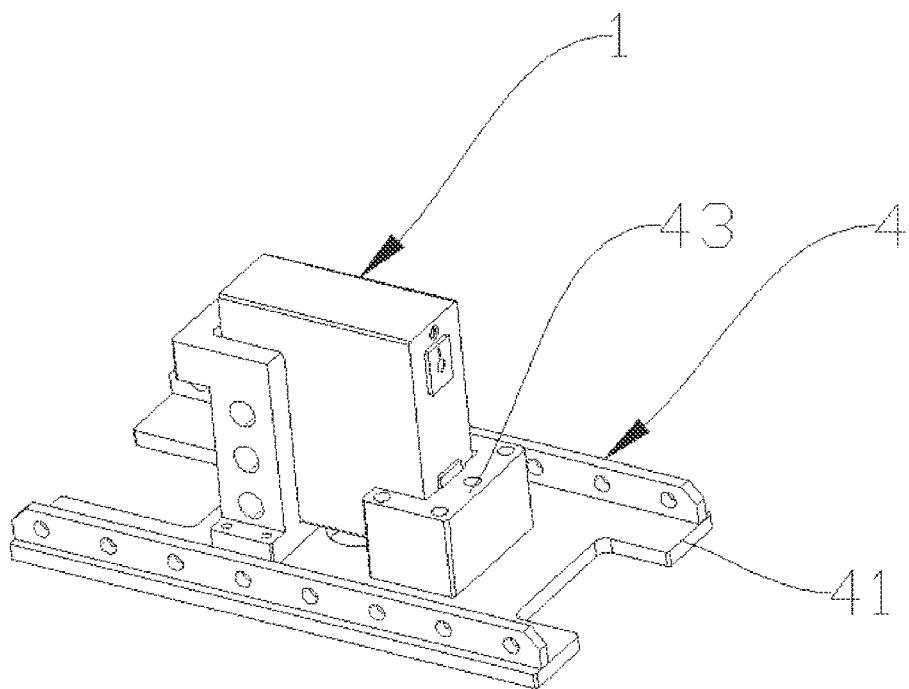
FIG. 3 is a schematic diagram of a base plate, a bayonet and a to-be-wetted device provided by Embodiment 1.
Figure 4:
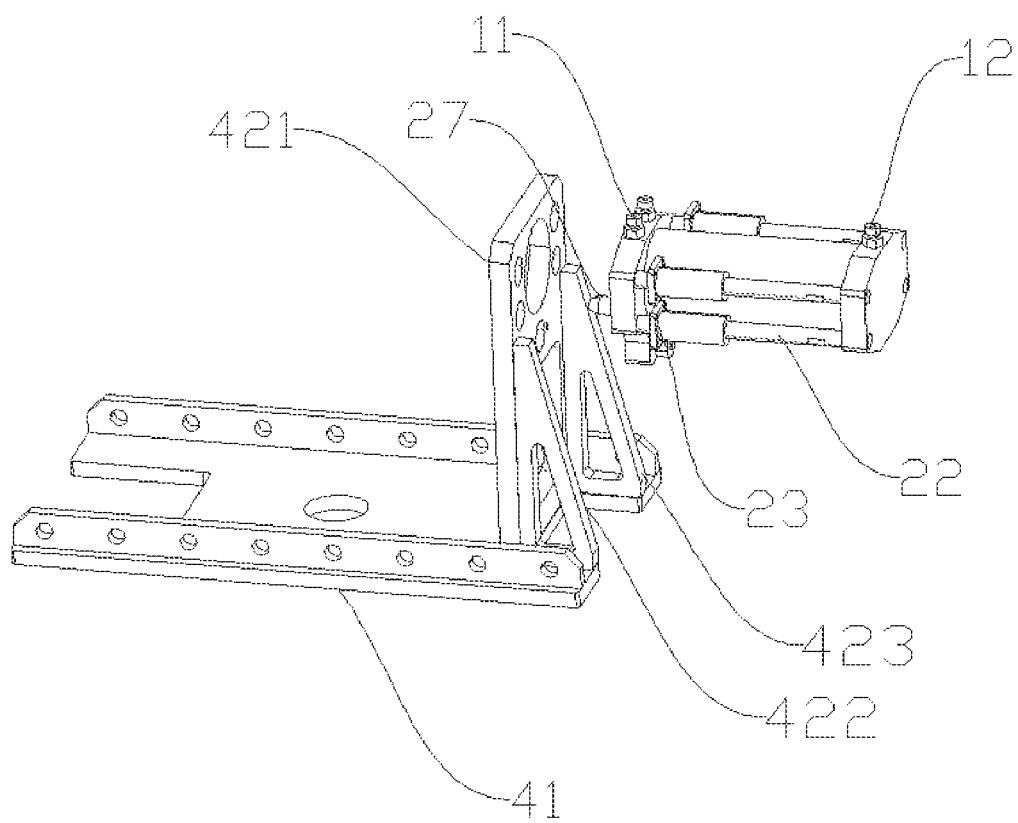
FIG. 4 is a schematic diagram of the base plate, a bracket and a liquid injection device provided by Embodiment 1.

As shown in FIG. 1, FIG. 2 and FIG. 4, the piston mechanism comprises a piston 13, an edge of the piston 13 clings to an inner wall of the liquid injection device 2, and the piston 13 is driven to slide along the inner wall of the liquid injection device 2 under an action of a driving rod or an external air pump, so as to generate a positive pressure and a negative pressure between the liquid outlet head 27 and the piston 13. The piston 13 being driven by the external air pump specifically comprises that: one end of the liquid injection device 2 far away from the liquid outlet head 27 is provided with a mechanical valve 12, and the mechanical valve 12 is connected with the external air pump, so as to drive the piston mechanism to slide in the liquid injection device 2 based on air blowing and suction of the air pump. The piston 13 being driven by the driving rod specifically comprises that: the edge of the piston 13 clings to the inner wall of the liquid injection device 2, and the driving rod is connected with the piston 13, so as to drive the piston 13 to slide along the inner wall of the liquid injection device 2.

In an embodiment, the piston 13 is driven by the external air pump, wherein one end of the liquid injection device 2 far away from the liquid outlet head 27 is provided with the mechanical valve 12, and the mechanical valve 12 is connected with the external air pump. When air suction is performed on the liquid injection device 2, the piston 13 moves towards one end far away from the liquid outlet head 27; and when air blowing is performed on the liquid injection device 2, the piston 13 moves towards one end close to the liquid outlet head 27, thus injecting the wetting liquid in the liquid injection device 2 into the to-be-wetted device 1.

In another embodiment, the piston 13 is driven by the driving rod, wherein the piston mechanism comprises the piston 13 and the driving rod, the edge of the piston 13 clings to the inner wall of the liquid injection device 2, the driving rod is connected with the piston 13, and the driving rod pushes the piston 13 to move towards one end close to or far away from the liquid outlet head 27. When the driving rod pushes the piston 13 to move towards one end close to the liquid outlet head 27, the wetting liquid in the liquid injection device 2 is injected into the to-be-wetted device 1.

In other embodiments, one end of the liquid injection device 2 far away from the liquid outlet head 27 is provided with the mechanical valve 12, and the mechanical valve 12 is used for being connected with the external air pump, so as to drive the piston mechanism to slide in the liquid injection device 2 through air blowing and suction of the air pump. The piston mechanism comprises the piston 13 and the driving rod, the edge of the piston 13 clings to the inner wall of the liquid injection device 2, and the driving rod is connected with the piston 13, so as to drive the piston 13 to slide along the inner wall of the liquid injection device 2 through the driving rod.

Figure 6:
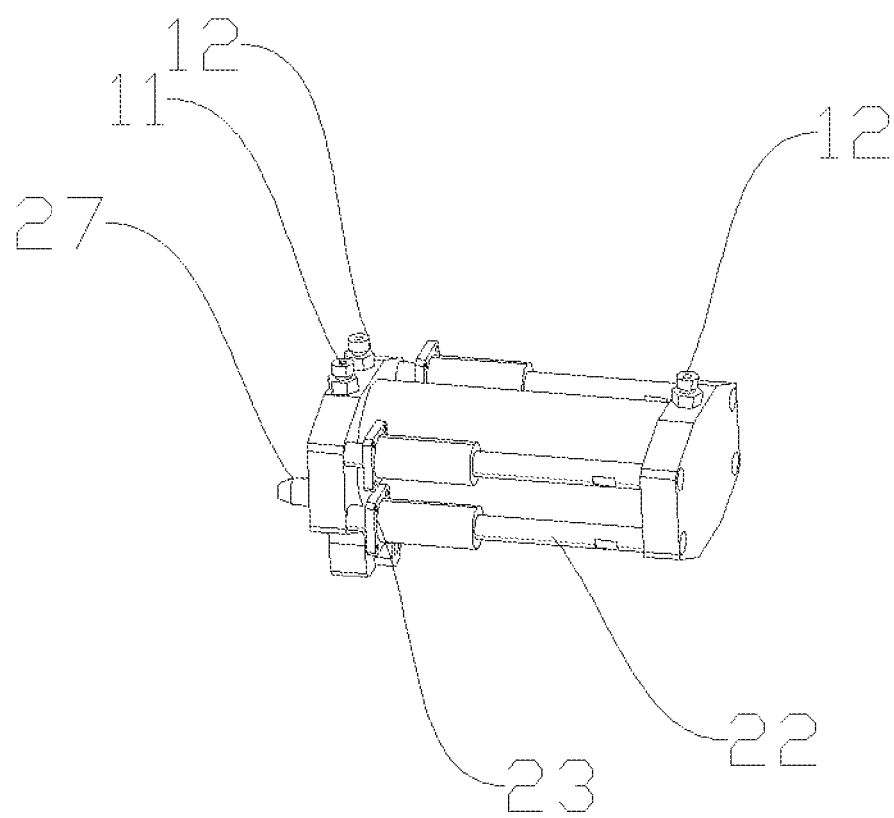
FIG. 6 is a schematic diagram of the liquid injection device provided by Embodiment 1.
Figure 7:
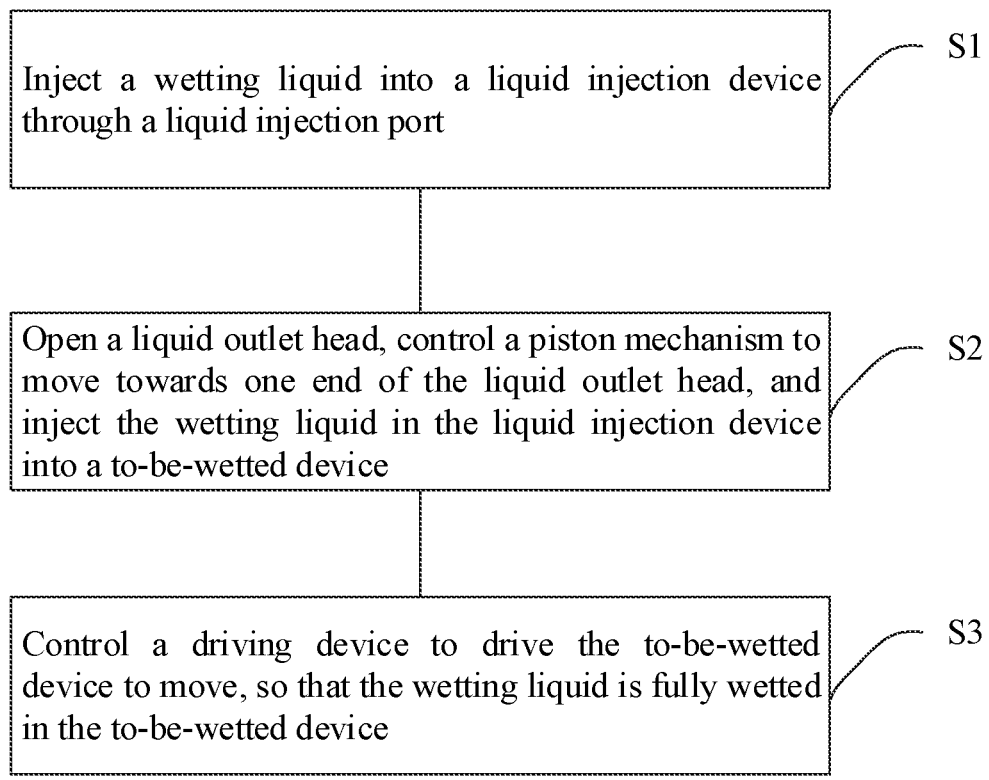
FIG. 7 is a flow chart of liquid injection provided by Embodiment 2.

As shown in FIG. 1 and FIG. 6, one end of the liquid injection device 2 close to the liquid outlet head 27 may also be provided with the mechanical valve 12, the mechanical valve 12 is connected with the external air pump for pumping out gas in the liquid injection device 2, so as to ensure a vacuum state of the liquid injection device 2.

As shown in FIG. 1 to FIG. 4, the centrifugal battery liquid injection mechanism further comprises a supporting device 4, wherein the liquid injection device 2 and the to-be-wetted device 1 are both connected with the supporting device 4. The driving device 3 is connected with the to-be-wetted device 1 by being connected with the supporting device 4. Specifically, the supporting device 4 is provided with a bayonet 43; and the to-be-wetted device 1 is detachably connected with the supporting device 4 by being embedded into the bayonet 43.

In the embodiment, the bayonet 43 is a concave structure formed by two limiting blocks, and used for limiting positions of four surfaces of the to-be-wetted device 1. When the to-be-wetted device 1 is arranged between the two limiting blocks, front, rear, left and right surfaces of the to-be-wetted device 1 are all within a scope limited by the limiting blocks, and a position of the to-be-wetted device 1 is limited by cooperation of the two limiting blocks, so as to achieve a structural stability and improve a safety of liquid injection.

In other embodiments, the bayonet 43 is a protruding structure, the to-be-wetted device 1 is provided with a recess, and the to-be-wetted device 1 is limited at the bayonet 43 by cooperation between the protrusion and the recess.

As shown in FIG. 1 to FIG. 5, the liquid outlet head 27 may be a hose tube or a hard tube. It is easier to change a position of the liquid outlet head 27 by using the hose tube, so that a sealing performance between the to-be-wetted device 1 and the liquid injection device 2 is strengthened, and external gas cannot enter the to-be-wetted device 1 or the liquid injection device 2, thus improving the liquid injection efficiency. The liquid outlet head has a long service life and is not easy to be damaged by using the hard tube.

In the embodiment, the liquid outlet head 27 comprises the hose tube, and the to-be-wetted device 1 and the liquid injection device 2 are connected through the hose tube.

As shown in FIG. 1 to FIG. 5, the supporting device 4 is further provided with a stereoscopic position regulating assembly, and the liquid injection device 2 is connected with the stereoscopic position regulating assembly. Specifically, the supporting device 4 is provided with a bracket 42, and the liquid injection device 2 penetrates through the bracket 42, so that the liquid injection device 2 is detachably connected with the bracket 42. The position adjusting assembly is arranged between the liquid injection device 2 and the bracket 42 for adjusting a position of the liquid injection device 2.

In an embodiment, the stereoscopic position regulating assembly is arranged at one end far away from the liquid injection device 2, and a position of the bracket 42 is adjusted through the stereoscopic position regulating assembly, thus adjusting the position of the liquid injection device 2.

In another embodiment, the stereoscopic position regulating assembly is arranged between the liquid injection device 2 and the bracket 42, and the position of the liquid injection device 2 is directly adjusted through the stereoscopic position regulating assembly.

As shown in FIG. 1 and FIG. 4, the supporting device 4 is further provided with a base plate 41, the base plate 41 is welded or threadedly connected with the bracket 42 and the bayonet 43 respectively for fixing the bracket 42 and the bayonet 43. Two opposite ends of the base plate 41 are respectively provided with a notch, the notch may be a circle, a rectangle, a triangle or other polygons with more than four sides. In the embodiment, the notch is the rectangle, so that a cross section of the base plate 41 is H-shaped, the bracket 42 is arranged at one end of the base plate 41, and a bottom portion of the bracket 42 is connected with an edge of the notch.

The base plate 41, the bracket 42 and the bayonet 43 are provided with hollowed-out portions, and the hollowed-out portions comprise a circle, a triangle, a rectangle or a polygon. The polygon refers to a pattern with more than four sides. Specifically, an edge of the base plate 41 and a surface of the bayonet 43 are provided with a plurality of circular hollowed-out portions, and the circular hollowed-out portions are arranged at equal intervals. The bracket 42 is provided with a triangular hollowed-out portion and a rectangular hollowed-out portion. An overall weight of the centrifugal battery injection mechanism is reduced and an appearance of a product is improved through the hollowed-out portions arranged in the base plate 41, the bracket 42 and the bayonet 43.

Specifically, the bracket 42 comprises a fixed plate 421, a first supporting plate 422 and a second supporting plate 423. The first supporting plate 422 and the second supporting plate 423 are connected to two edges of the fixed plate 421, and the first supporting plate 422 and the second supporting plate 423 are triangular, thus having the advantage of stable support. Hollowed-out portions inside the first supporting plate 422 and the second supporting plate 423 are also triangular, and a lower portion of the fixed plate 421 is provided with a rectangular hollowed-out portion. The design of the hollowed-out portions saves materials and reduces a product quality on one hand, and realizes an attractive appearance of the product.

Figure 5:
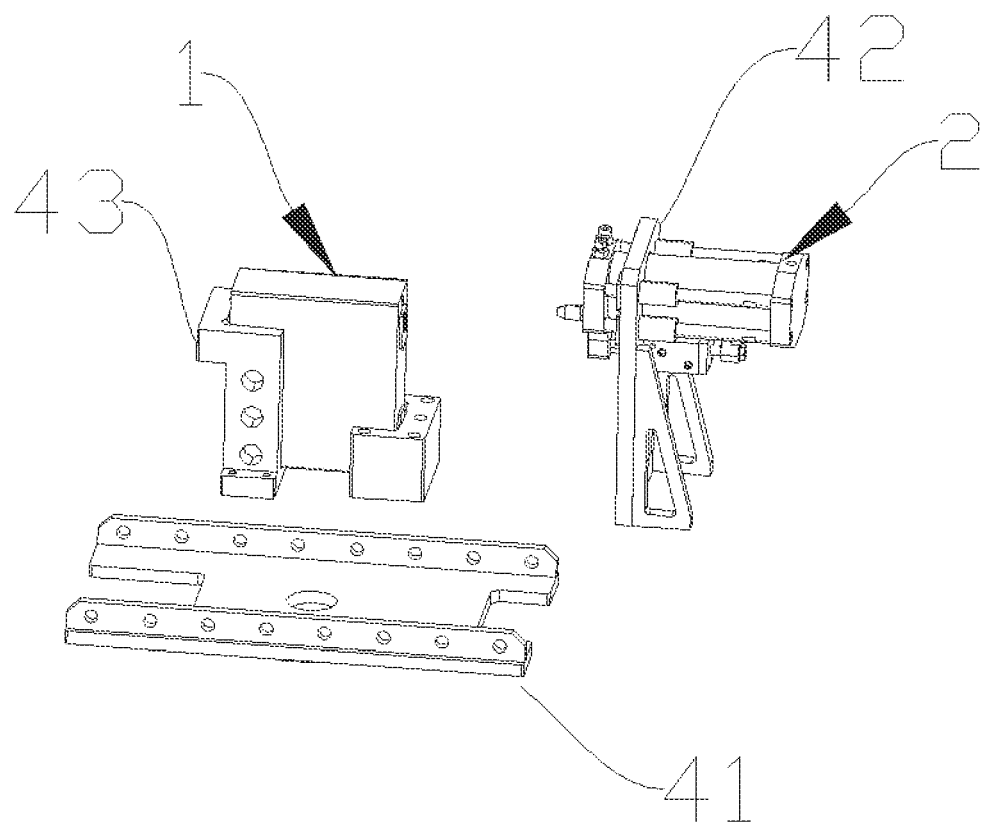
FIG. 5 is n exploded view of the centrifugal battery liquid injection mechanism provided by Embodiment 1.

As shown in FIG. 1, FIG. 4 and FIG. 5, a surface of the liquid injection device 2 is surrounded by a plurality of supporting columns 22, and the supporting columns 22 penetrate through the bracket 42. The supporting column 22 is provided with a limiting member 23, and the limiting member 23 abuts against the bracket 42 for fixing the liquid injection device 2 on the bracket 42, thus ensuring a stability of the liquid injection device 2, and ensuring that the liquid injection device 2 is not easy to slide off the bracket 42 to damage the liquid injection device 2.

In the embodiment, the limiting member 23 comprises a limiting sheet and a limiting ring, the limiting sheet and the limiting ring are arranged on the supporting column 22, and a distance between the limiting sheet and the limiting ring is no less than a thickness of the bracket 42, so that one sides of the limiting sheet and the limiting ring close to the bracket 42 abut against the bracket 42, thus positioning the liquid injection device 2 and making a structure of the liquid injection device 2 more stable.

In other embodiments, the limiting member 23 is a screw, a bolt or a pin, and the limiting member 23 is connected to the bracket 42 to position the liquid injection device 2, thus making the structure of the liquid injection device 2 more stable.

As shown in FIG. 1 to FIG. 5, the centrifugal battery liquid injection mechanism further comprises a controller and a monitoring module. An input end of the controller is electrically connected with the monitoring module, and an output end of the controller is electrically connected with the driving device 3. Specifically, the monitoring module is configured for detecting liquid injection information of the to-be-wetted device 1 and transmitting the obtained liquid injection information to the controller. The controller is used for receiving the liquid injection information transmitted from the monitoring module, reading preset information stored in the controller in advance, comparing the liquid injection information with the preset information, and generating a corresponding rotation instruction. The driving device 3 is used for receiving the rotation instruction sent from the controller. The rotation instruction comprises a rotating direction and a number of rotations. The driving device 3 receives the rotation instruction, and controls the rotating direction and the number of rotations.

In the embodiment, the driving device 3 rotates clockwise by a turn and then rotates counterclockwise by a turn, which is one cycle. The rotation cycle of the driving device 3 is controlled through the rotation instruction, so that the wetting liquid is fully wetted in the to-be-wetted device 1, thus improving the liquid injection efficiency. The driving device 3 comprises an electric motor or a motor.

The present invention provides the centrifugal battery liquid injection mechanism, which comprises the liquid injection device 2 and the driving device 3, wherein the liquid injection device 2 is provided with the piston mechanism and the liquid outlet head 27 capable of being opened and closed, and one end of the liquid injection device 2 close to the liquid outlet head 27 is further provided with the liquid injection port 11 capable of being opened and closed; and the liquid injection port 11 is used for injecting the wetting liquid into the liquid injection device 2. The liquid injection device 2 is connected with a to-be-wetted device 1 through the liquid outlet head 27, so as to inject the wetting liquid into the to-be-wetted device 1. The driving device 3 is connected with the to-be-wetted device 1 for driving the to-be-wetted device 1 to move. Compared with the prior art, the centrifugal battery liquid injection mechanism put forward by the present invention has the advantages of apparent wetting effect, high safety performance, low cost and simple operation.

In the embodiment, the to-be-wetted device 1 is a battery, and the wetting liquid inside the liquid injection device 2 is an electrolyte. The electrolyte enters the to-be-wetted device 1 from the liquid injection device 2 by connecting the liquid outlet head 27 to the to-be-wetted device 1.

Embodiment 2

Based on Embodiment 1, the embodiment puts forward a liquid injection method using the centrifugal battery injection mechanism put forward by Embodiment 1, with a schematic diagram as shown in FIG. 6 of the specification. A specific solution is as follows.

The liquid injection method comprises the following steps of:
  S1: injecting the wetting liquid into the liquid injection device through the liquid injection port;
  S2: opening the liquid outlet head, controlling the piston mechanism to move towards one end of the liquid outlet head, and injecting the wetting liquid in the liquid injection device into the to-be-wetted device; and
  S3: controlling the driving device to drive the to-be-wetted device to move, so that the wetting liquid is fully wetted in the to-be-wetted device.

The step S1 of injecting the wetting liquid into the liquid injection device through the liquid injection port comprises:
  closing the liquid outlet head and the liquid injection port, and controlling the piston mechanism to move towards one end far away from the liquid outlet head, so as to form a negative pressure space between the liquid outlet head and the piston mechanism; opening the liquid injection port, and injecting the wetting liquid into the liquid injection device through the liquid injection port; and after finishing liquid injection, closing the liquid injection port. By the operations above, no outside air will enter the liquid injection device when the wetting liquid is injected into the liquid injection device.

The liquid injection method further comprises: keeping the liquid injection port in a closed state, opening the liquid outlet head, and controlling the piston mechanism to move towards one end far away from the liquid outlet head, so as to pump out gas in the to-be-wetted device. The wetting liquid is fully wetted in the to-be-wetted device by pumping out gas.

The step S2 of opening the liquid outlet head, controlling the piston mechanism to move towards one end of the liquid outlet head, and injecting the wetting liquid in the liquid injection device into the to-be-wetted device, comprises the following operations.

In an embodiment, the liquid outlet head is opened, and the piston is driven by the external air pump. When air suction is performed on the liquid injection device by the external air pump, the piston moves towards one end far away from the liquid outlet head; and when air blowing is performed on the liquid injection device by the external air pump, the piston moves towards one end close to the liquid outlet head, thus injecting the wetting liquid in the liquid injection device into the to-be-wetted device.

In another embodiment, the liquid outlet head is opened, and the driving rod is pushed to drive the piston. When the driving rod moves towards one end far away from the liquid outlet head, the piston moves towards one end far away from the liquid outlet head; and when the driving rod moves towards one end close to the liquid outlet head, the piston moves towards one end close to the liquid outlet head, thus injecting the wetting liquid in the liquid injection device into the to-be-wetted device.

The step S3 of controlling the driving device to drive the to-be-wetted device to move, so that the wetting liquid is fully wetted in the to-be-wetted device, comprises:
controlling the driving device to drive the to-be-wetted device to rotate clockwise, rotate counterclockwise, or alternately rotate clockwise and counterclockwise, so that the wetting liquid is fully wetted in the to-be-wetted device.

In the embodiment, the driving device is controlled to drive the to-be-wetted device to rotate clockwise by a turn, and the driving device is controlled to drive the to-be-wetted device to rotate counterclockwise by a turn, which is one cycle. The rotation cycle is controlled according to a wetting degree until the wetting liquid is fully wetted in the to-be-wetted device, and then the driving device stops rotating.

The present invention provides the liquid injection method using the centrifugal battery liquid injection mechanism, and the liquid injection method comprises the following steps of: injecting the wetting liquid into the liquid injection device through the liquid injection port; opening the liquid outlet head, controlling the piston mechanism to move towards one end of the liquid outlet head, and injecting the wetting liquid in the liquid injection device into the to-be-wetted device; and controlling the driving device to drive the to-be-wetted device to move, so that the wetting liquid is fully wetted in the to-be-wetted device. Compared with the prior art, the liquid injection method put forward by the present invention has the advantages of apparent wetting effect, high safety performance, low cost and simple operation.

Those of ordinary skills in the art should understand that the modules or steps of the present invention above may be implemented by a commonly used computing device, and may be concentrated on a single computing device or distributed on a network composed of multiple computing devices. Optionally, the modules or steps may be implemented by a program code executable by the computing device, so that the modules or steps may be stored in a storage device to be executed by the computing device, or the modules or steps may be implemented by making the modules or steps into various integrated circuit modules respectively, or by making a plurality of modules or steps from the modules or steps into a single integrated circuit module. In this way, the present invention is not limited to any specific combination of hardware and software.

It should be noted that the above are only the preferred embodiments of the present invention and the applied technical principles. Those skilled in the art may understand that the present invention is not limited to the specific embodiments herein, and various obvious changes, readjustments and substitutions can be made by those skilled in the art without departing from the scope of protection of the present invention. Therefore, although the present invention has been explained in detail through the above embodiments, the present invention is not limited to the above embodiments, but may also comprise more other equivalent embodiments without departing from the concept of the present invention, and the scope of the present invention is determined by the scope of the appended claims.

The above only describes a few specific implementation scenarios of the present invention, but the present invention is not limited to this. Any changes that those skilled in the art can think of should fall within the scope of protection of the present invention.

The invention claimed is:

1. A centrifugal battery liquid injection mechanism, comprising a liquid injection device, a driving device, and a supporting device, wherein,
the liquid injection device comprises a main body and a plurality of supporting columns extending along a liquid injection direction and arranged around the main body; the main body has two ends opposite to each other, wherein one of the two ends is arranged with a liquid outlet head capable of being opened and closed and a liquid injection port capable of being opened and closed; the liquid injection port is used for injecting a wetting liquid into the liquid injection device; and the liquid injection device is connected with a to-be-wetted device through the liquid outlet head, so as to inject the wetting liquid into the to-be-wetted device; a piston mechanism is arranged inside the main body; the other of the two ends is arranged with a mechanical valve; and the mechanical valve is connected with an external air pump, so as to drive the piston mechanism to slide in the liquid injection device based on air blowing and suction of the air pump; the piston mechanism comprises a piston and a driving rod; an edge of the piston clings to an inner wall of the liquid injection device, and the driving rod is connected with the piston, so as to drive the piston to slide along the inner wall of the liquid injection device; the piston is capable of moving towards one end of the liquid outlet head, and therefore injects the wetting liquid into the liquid into the to-be-wetted device; the piston is capable of moving towards one end far away from the liquid outlet head, so as to pump out gas in the to-be-wetted device;

the driving device is connected with the to-be-wetted device for driving the to-be-wetted device to move; and the liquid injection device and the to-be-wetted device are both connected with the supporting device, and the driving device is connected with the to-be-wetted device by being connected with the supporting device; the supporting device comprises a bracket, and the liquid injection device is detachably connected with the bracket; in condition of the liquid injection device being detached with the bracket, the plurality of supporting columns pass through the bracket.

2. The centrifugal battery liquid injection mechanism according to claim 1, wherein the supporting device is provided with a bayonet; and the to-be-wetted device is detachably connected with the supporting device by being embedded into the bayonet.

3. The centrifugal battery liquid injection mechanism according to claim 1, wherein the supporting device is provided with a stereoscopic position regulating assembly, and the liquid injection device is connected with the stereoscopic position regulating assembly.

4. The centrifugal battery liquid injection mechanism according to claim 1, wherein the liquid outlet head comprises a hose tube.

* * * * *